(12) United States Patent
Riemann (10) Patent No.: US 11,020,822 B2
(45) Date of Patent: Jun. 1, 2021

(54) ACTIVE COOLING OF ADDITIVE MANUFACTURING PROCESS

(71) Applicant: FORMALLOY, LLC, Spring Valley, CA (US)

(72) Inventor: Jeffrey L. Riemann, Spring Valley, CA (US)

(73) Assignee: Formalloy Technologies, Inc., Spring Valley, CA (US)

( * ) Notice: Subject to any disclaimer, the term of this patent is extended or adjusted under 35 U.S.C. 154(b) by 262 days.

(21) Appl. No.: 16/058,866

(22) Filed: Aug. 8, 2018

(65) Prior Publication Data

US 2019/0047089 A1    Feb. 14, 2019

Related U.S. Application Data (60) Provisional application No. 62/543,811, filed on Aug. 10, 2017.

(51) Int. Cl.
| | | |
|---|---|---|
| *B23K 26/342* | (2014.01) | |
| *B33Y 30/00* | (2015.01) | |
| *B33Y 40/00* | (2020.01) | |
| *B23K 26/70* | (2014.01) | |
| *B23K 26/03* | (2006.01) | |
| *B23K 26/14* | (2014.01) | |
| *B33Y 50/02* | (2015.01) | |

(52) U.S. Cl.
CPC .......... *B23K 26/342* (2015.10); *B23K 26/034* (2013.01); *B23K 26/14* (2013.01); *B23K 26/1437* (2015.10); *B23K 26/703* (2015.10); *B33Y 30/00* (2014.12); *B33Y 40/00* (2014.12); *B33Y 50/02* (2014.12)

(58) Field of Classification Search
CPC .. B23K 26/034; B23K 26/342; B23K 26/703; B23K 37/003; B22F 2203/11
See application file for complete search history.

(56) References Cited

U.S. PATENT DOCUMENTS

| | | | | |
|---|---|---|---|---|
| 5,321,228 | A * | 6/1994 | Krause | B05B 7/228 219/121.64 |
| 6,162,378 | A * | 12/2000 | Bedal | B29C 64/40 264/40.1 |
| 6,332,906 | B1 * | 12/2001 | Haynes | B22F 3/20 419/28 |
| 2006/0266740 | A1 * | 11/2006 | Sato | B23K 26/144 219/121.63 |
| 2013/0287934 | A1 * | 10/2013 | Ramsundar | B22F 3/1055 427/9 |
| 2016/0369399 | A1 * | 12/2016 | Ma | B33Y 10/00 |
| 2017/0051386 | A1 * | 2/2017 | Carter | B33Y 10/00 |
| 2019/0061061 | A1 * | 2/2019 | Fischer | B23K 26/702 |

* cited by examiner

*Primary Examiner* — Ibrahime A Abraham
*Assistant Examiner* — John J Norton
(74) *Attorney, Agent, or Firm* — Patterson + Sheridan LLP (57) ABSTRACT

Aspects of the present disclosure relate to. In one example, a method of controlling an additive manufacturing machine includes: measuring a first temperature of a part being processed by the additive manufacturing machine; determining that the first measured temperature exceeds a temperature threshold; activating an auxiliary gas flow; cooling the auxiliary gas flow with a cooling system; and directing the cooled auxiliary gas flow towards the part.

20 Claims, 4 Drawing Sheets

ACTIVE COOLING OF ADDITIVE MANUFACTURING PROCESS

CROSS-REFERENCE TO RELATED APPLICATION

This application claims the benefit of U.S. Provisional Patent Application No. 62/543,811, filed on Aug. 10, 2017, the disclosure of which is incorporated herein by reference in its entirety.

The present disclosure relates to additive manufacturing systems and methods. In particular, aspects of the present disclosure relate to systems and methods for actively cooling an additive manufacturing process, such as a laser metal deposition process, in order to improve structural characteristics of the piece built by the additive manufacturing process.

Examples of commercially available additive manufacturing methods include extrusion-based methods (e.g., Fused Deposition Modeling (FDM)), fusing or binding from a powder bed based methods (e.g., Selective Laser Sintering (SLS), Selective laser melting (SLM), and Electron beam melting (EBM)), lamination methods, photopolymerization methods (e.g., stereo lithography), powder- or wire-fed directed energy deposition methods (e.g., direct metal deposition (DMD), laser additive manufacturing (LAM), laser metal deposition (LIVID)), and others.

Laser metal deposition (LMD) is a laser-based additive manufacturing process in which metal structures are built up on a substrate or metal layers and structures are applied to existing components (e.g., cladding) in layers. In LMD, a laser generates a molten bath on an existing surface into which metal powder is directed through a nozzle in a deposition head (e.g., using a carrier gas). The powder melts and bonds with the base material in the molten pool thereby forming new layers and ultimately structures additively.

An issue with all heat-based manufacturing processes is the effect of the heat on the underlying structure of the built piece. For example, the amount of heat imparted on a build piece may affect the underlying grain structure of the build piece in a way that degrades its physical properties, such as strength, resilience, finish, etc. The residual heat of the heat-based manufacturing process effectively reduces the cooling rate of the structure, which results in elongated grain sizes as the cooling rate decreases. Elongated grains typically result in reduced material strength when compared with smaller grain structures. Hence, elongated grains are typically undesirable.

In the context of a laser-based additive manufacturing process, elongated grains typically begin forming in the deposited structure when the amount of laser energy directed into a structure affects the cooling rate of nearby, already-processed structures. For example, while an initial deposited layer may cool relatively quickly owing to the lack of residual heat in the build piece, as more layers are built incrementally, the amount of heat in the build piece increases, and the incremental layers cool more slowly because of the trapped residual heat in each layer. Depending upon the amount of laser energy directed into the structure and the size or mass of the structure, elongated grains may begin to appear at different locations in the structure. Running relatively high laser power levels on relatively small structures will result in elongated grains more quickly than when running relatively low laser power levels.

In order to achieve homogenous, small grain structures, traditional additive manufacturing processes significantly limit the laser power applied to the build piece and/or implement delays in the build-up process to allow the structure to cool naturally. However, these methods of controlling the heat of the manufacturing process on surrounding structures results in a slower build process, and may also limit the types of materials that can be used in the additive manufacturing process. For example, having to limit the laser power may ultimately limit the access to materials that require significantly higher heat to process.

Accordingly, what is needed are improved systems and methods for controlling cooling of heat-based additive manufacturing processes so that process time may be improved without sacrificing underlying material properties.

BRIEF SUMMARY

Certain embodiments provide a method of controlling an additive manufacturing machine, including: measuring a first temperature of a part being processed by the additive manufacturing machine; determining that the first measured temperature exceeds a temperature threshold; activating an auxiliary gas flow; cooling the auxiliary gas flow with a cooling system; and directing the cooled auxiliary gas flow towards the part.

Other embodiments may provide an apparatus configured to perform a method of controlling an additive manufacturing machine, or a computer-readable medium comprising instructions that when executed by a processor of an apparatus, cause the apparatus to perform a method of controlling an additive manufacturing machine.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide methods and apparatuses for actively cooling an additive manufacturing process, such as a laser metal deposition process, in order to improve structural characteristics of the piece built by the additive manufacturing process.

Actively cooling an additive manufacturing process may be accomplished through a combination of beneficial mechanisms. For example, a directed actively cooled gas flow may be applied to the build piece in order to encourage cooling, which may be referred to as directed active cold shielding (DACS). In particular, the directed actively cooled gas flow may be directed to areas surrounding the active processing area (e.g., the melt pool in a laser metal deposition process) in order to inhibit heating of areas adjacent to the process area (e.g., areas subject to laser reflection, convective heating, or conductive heating from the process area). The directed actively cooled gas flow may also be directed to areas that have been recently processed or that are to be processed (e.g., to pre-cool the material). In other words, the actively cooled gas flow may be used both when the directed energy source (e.g., laser or electron beam) is on and actively processing material or when it is off. Because the actively cooled gas flow may be directed by elements of a deposition assembly, the actively cooled gas flow may thus be directed to the same range of areas as the directed energy source.

The gas flow may be actively cooled before being directed towards the build piece in by, for example, a refrigeration system or vortex cooler. Though these are only two examples, and any sort of mechanism for reducing the temperature of the gas flow below ambient may be effective.

In some example, existing additive manufacturing gas flows may be actively cooled (e.g., carrier gas and shield gas) in addition to auxiliary gas flows. In this way, the overall cooling capacity of an additive manufacturing system may be increased. Further, in some cases the various gas flows (e.g., carrier, shield, and auxiliary) may be cooled to different temperatures to create a cooling gradient in order to avoid over-cooling or embrittling materials.

The actively cooled gas may preferably be a gas with a high thermal conductivity, such as helium or hydrogen, which may be a different gas than traditional shield gases used in additive manufacturing processes, such as argon or nitrogen. In some embodiments, gas mixtures can be used such as helium-argon to increase thermal conductivity at a reduced cost versus pure helium since helium is expensive.

The beneficial effects of directed actively cooled gas flows may be further enhanced by actively monitoring temperatures of various aspects of the build piece (e.g., the melt pool and surrounding areas) and controlling aspects of the directed actively cooled gas flow, such as the volume of gas flow and the temperature of the gas flow. For example, a control system of an additive manufacturing machine may monitor build conditions and dynamically control the aforementioned aspects of the directed actively cooled gas flows in a closed-loop type control system. Further, the control system may actively control aspects of the directed actively cooled gas flows based on underlying material properties, such as the material type. In other words, the control system may know the type of material or materials being processed and adjust cooling parameters based on known attributes of the material, such as sensitivity to rapid cooling, heat capacity, conductivity, etc.

Example Additive Manufacturing System

Figure 1:
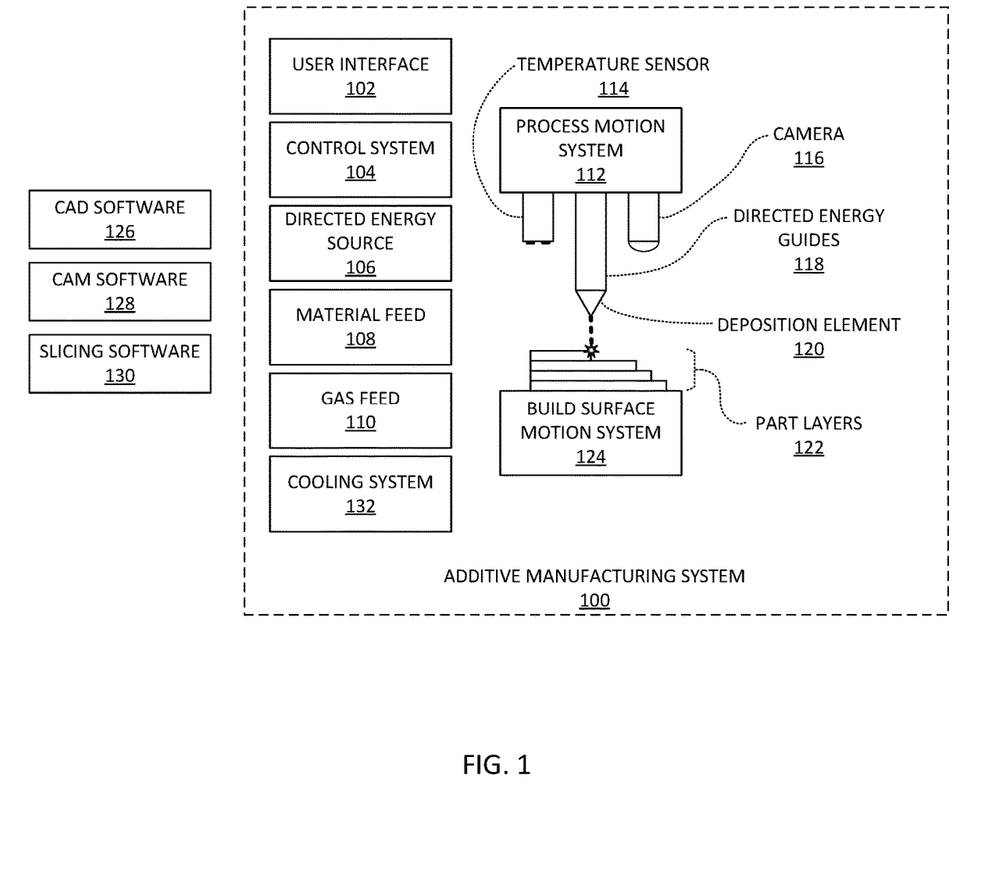
FIG. 1 depicts an example of an additive manufacturing system.

FIG. 1 depicts an example of an additive manufacturing system 100. Additive manufacturing system 100 includes a user interface 102. User interface 102 may be, for example, a graphical user interface comprising hardware and software controls for controlling additive manufacturing system 100. In some examples, user interface 102 may be integral with additive manufacturing system 100 while in other examples user interface 102 may be remote from additive manufacturing system 100 (e.g., on a remote computer such as a laptop computer or a personal electronic device).

Additive manufacturing system 100 also includes a control system 104. In this example, control system 104 is in data communication with user interface 102 as well as directed energy source 106, material feed 108, gas feed 110, process motion system 112, temperature sensor 114, camera 116, build surface motion system 124, and cooling system 132. In other examples, control system 104 may be in data communication with further elements of additive manufacturing system 100, which are not depicted in this example.

Control system 104 may include hardware and software for controlling various aspects of additive manufacturing system 100. For example, control system 104 may include one or more: processors, memories, data storages, physical interfaces, software interfaces, software programs, firmwares, and other aspects in order to coordinate and control the various aspects of additive manufacturing system 100. In some examples, control system 104 may include network connectivity to various aspects of additive manufacturing system 100 as well as to external networks, such as the Internet and other networks, such as local area networks (LANs) and wide area networks (WANs). In some examples, control system 104 may be a purpose-built logic board, while in other examples control system 104 may be implemented by a general purpose computer with specific software components for controlling the various aspects of additive manufacturing system 100.

Control system 104 may interpret commands received from user interface 102 and thereafter cause appropriate control signals to be transmitted to other aspects of additive manufacturing system 100. For example, a user may input data representing a part to be processed using additive manufacturing system 100 into user interface 102 and control system 104 may act upon that input to cause additive manufacturing system 100 to process the part.

In some examples, control system 104 may compile and execute machine control codes, such as G-code data, that causes aspects of additive manufacturing machine 100 to operate. For example, the machine control codes may cause process motion system 112 or build surface motion system 124 to move to specific positions and at specific speeds. As another example, the machine control codes may cause directed energy source 106, material feed 108, gas feed 110, or cooling system 132 to activate or deactivate. Further, the machine control codes may modulate the operation of the aforementioned aspects of additive manufacturing machine 100, such as by increasing or decreasing the power of directed energy source 106, increasing or decreasing the flow rate of material feed 108 or gas feed 110, increasing or decreasing amount of cooling by cooling system 132, etc.

Process motion system 112 may move elements of additive manufacturing system 100 to exact positions. For example, process motion system 112 may position deposition element 120 at an exact distance from a part layer 122 being manufactured. Further, process motion system 112 may position temperature sensor 114 or camera 116 precisely to provide processing data, such as point temperatures, temperature gradients, heat maps, etc. In some examples, temperature sensor 114 may be a non-contact based sensor, such as an infrared or laser-based temperature sensor. Camera 116 may also include infrared-based optical sensors in order to view heat distributions and gradients in part layers 122. Both temperature 114 and camera 116 may provide active feedback related to the effects of directed actively cooled gas flows on the part being processed.

Directed energy source 106 may provide any suitable form of directed energy, such as a laser beam (e.g., from a fiber laser) or an electron beam generator, which is capable of melting a manufacturing material, such as a metal powder. Directed energy source 106 may interact with directed energy guides 118 in order to, for example, direct or focus a particular type of directed energy. For example, directed energy guides 118 may comprise one or more optical elements, such as mirrors, lenses, filters, and the like, configured to focus a laser beam at a specific focal point and to control the size of the focused laser point. In this way, the actual creation of the laser energy by directed energy source 106 may be located remote from the manipulation and focus of the laser energy by directed energy guides 118.

Directed energy source 106 may also be used to remove material from a manufactured part, such as by ablation.

Material feed 108 may supply building material, such as a powder or wire, to deposition element 120. In some examples, material feed 108 may be a remote reservoir including one or more types of raw material (e.g., different types of metal) to be used by additive manufacturing system 100.

Deposition element 120 may be connected with material feed 108 and may direct material, such as powder, towards a focal point of directed energy source 106. In this way, deposition element 120 may control the amount of material that is additively manufactured at a particular point in time. Deposition element may include nozzles, apertures, and other features for directing material, such as metal powder, towards a manufacturing surface, such as a build surface or previously deposited material layer. In some examples, deposition element 120 may have controllable characteristics, such as controllable nozzle aperture sizes. In some examples, deposition element 120 may be a nozzle assembly or deposition head of a laser metal deposition machine.

Gas feed 110 may be connected with deposition element 120 to provide propulsive force to the material provided by material feed 108. In some examples, gas feed 110 may modulate the gas flow rate to control material (e.g., powder) flow through deposition element 120 and/or to provide cooling effect during the manufacturing process.

Gas feed 110 may include feeds for a plurality of gas flows, such as carrier gas (as described above) as well as shield gas and auxiliary gas flows, such as directed actively cooled gas flows. Gas feed 110 may also include feeds for different types of gases so that, for example, different gases may be used for carrier gases, shield gases and auxiliary gases. Gas feed may provide different gas flows at different rates under the control of control system 104.

Gas feed 110 may also be connected with cooling system 132, which may actively cool any of the gas aforementioned gas flows (e.g., carrier, shield, and auxiliary). Cooling system 132 may be configured to apply different amounts of cooling to different gases under the control of control system 104.

Temperature sensor 114 may be any sort of sensor capable of measuring temperature to an object. In some examples, temperature sensor 114 is a contact-based sensor, such as a thermocouple, while in others temperature sensor is a contact-less sensor, such as a photo or laser-based sensor. Temperature sensor 114 may feed various types of temperature data back to control system 104, for example, to provide data for control of directed energy source 106, gas feed 110, and cooling system 132 to enable closed-loop control of directed actively cooled gas flows.

Camera 116 may include various forms of optical sensors, such as a visible spectrum optical sensor, or a non-visible spectrum (e.g., infrared) optical sensor. In some examples, the same sensor may be able to provide data in multiple spectrums. Camera 116 may include optics that allow it to change its field of view (e.g., zoom). Camera 116 may feed various types of image data, including infrared heat data, back to control system 104, for example, to provide data for control of directed energy source 106, gas feed 110, and cooling system 132 to enable closed-loop control of directed actively cooled gas flows.

Notably, while directed energy source 106, material feed 108, gas feed 110, temperature sensor 114, camera 116, directed energy guides 118, and deposition element 120 are shown in an example configuration in FIG. 1, other configurations are possible.

Process motion system 112 may control the positioning of one or more aspects of additive manufacturing system 100, such as temperature sensor 114, camera 116, and deposition element 120. In some examples, process motion system 112 may be movable in one or more degrees of freedom. For example, process motion system 112 may move and rotate deposition element 120, distance sensor 114, and tooling 116 in and about the X, Y, and Z axes during the manufacturing of part layers 122.

Build surface motion system 124 may control the positioning of, for example, a build surface upon which part layers 122 are manufactured. In some examples, build surface motion system 124 may be movable in one or more degrees of freedom. For example, build surface motion system 124 may move and rotate the build surface in and about the X, Y, and Z axes during the manufacturing of part layers 122. In some examples, the build surface may be referred to as a build plate or build substrate.

Cooling system 132 may be any sort of active cooling system, such as refrigeration system, a vortex cooler, evaporative gas cooling system, heat pump, and others.

Computer-Aided Design (CAD) software 126 may be used to design a digital representation of a part to be manufactured, such as a 3D model. CAD software 126 may be used to create 3D design models in standard data formats, such as DXF, STP, IGS, STL, and others. While shown separate from additive manufacturing system 100 in FIG. 1, in some examples CAD software 126 may be integrated with additive manufacturing system 100.

Slicing software 130 may be used to "slice" a 3D design model into a plurality of slices or design layers. Such slices or design layers may be used for the layer-by-layer additive manufacturing of parts using, for example, additive manufacturing system 100.

Computer-Aided Manufacturing (CAM) software 128 may be used to create machine control codes, for example, G-Code, for the control of additive manufacturing system 100. For example, CAM software 128 may create code in order to direct additive manufacturing system 100 to deposit a material layer along a 2D plane, such as a build surface, in order to build or process a part. For example, as shown in FIG. 1, part layers 122 are manufactured on (e.g., deposited on, formed on, processed on, etc.) build surface motion system 124 using process motion system 112 and deposition element 120.

In some examples, one or more of CAD software 126, CAM software 128, and Slicing Software 130 may be combined into a single piece or suite of software. For example, CAD or CAM software may have an integrated slicing function.

Example Control Methodologies for Directed Actively Cooled Gas Flows

Figure 2:
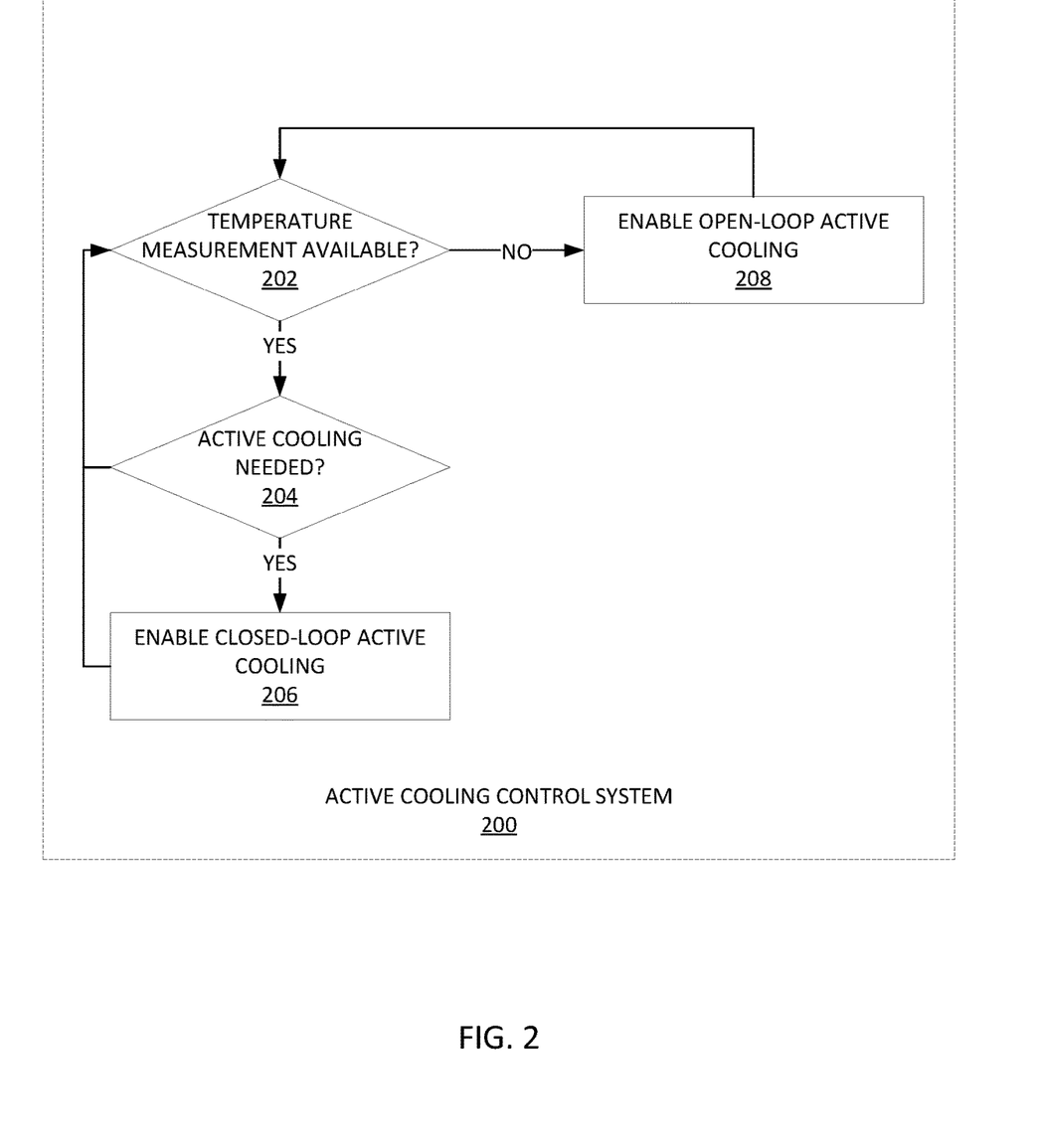
FIG. 2 depicts an example of a control flow for an active cooling control system.

FIG. 2 depicts an example of a control flow for an active cooling control system 200. In some examples, active cooling control system 200 may be a subsystem of control system 104 of FIG. 1, while in other examples, it may be a standalone control system otherwise integrated with additive manufacturing system 100 of FIG. 1.

At step 202, active cooling control system 200 determines if a temperature measurement is available. For example, the temperature measurement may be from temperature sensor 114 and/or camera 116 of FIG. 1. The temperature measurement may be an absolute measurement on a known temperature scale, such as a temperature in Celsius or Fahrenheit, or it could simply be a relative value, such as a digital value or a voltage.

If at step 202, no temperature measurement is available, then the flow moves to step 208 where open-loop active cooling is enabled. In one example, open loop active cooling 208 may be based on pre-programmed parameters, such as an amount or duration of gas flow, which gas flows to activate, a target active cooling temperature for the one or more gas flows, etc. In some cases, the open loop active cooling 208 may be based on testing and experience. In some cases, the open loop active cooling 208 parameters may be set in a machine control code, such as a G-Code, when programming a control system of an additive manufacturing machine, such as additive manufacturing system 100 in FIG. 1.

After enabling open-loop active cooling 208, the process may continue checking at a regular interval whether a temperature measurement is available.

If at step 202, a temperature measurement is available, then the flow proceeds to step 204 where it is determined whether active cooling is needed. For example, an additive manufacturing machine may be moving without its directed energy source energized and so the temperatures measured along the path may be sufficiently low that no active cooling is needed.

If at step 204 it is determined that active cooling is needed, then the flow moves to step 206 where closed-loop active cooling is enabled. Closed-loop active cooling 206 may also be based on pre-programmed parameters like open-loop active cooling 208; however, because of the temperature data, which closes the "feedback loop", the various parameters (such as an amount or duration of gas flow, which gas flows to activate, a target active cooling temperature for the one or more gas flows, etc.) may be dynamically adjusted based on the temperature condition. For example, the temperature measurement may be an input for one or more functions which set parameters values as outputs based on the input temperature. In other examples, the temperature may be used to determine parameter values via a lookup table or similar data structure.

Though not depicted in FIG. 2, in some examples active cooling control system 200 may be enabled or disabled based on other operational parameters of an additive manufacturing system, such as whether or not the additive manufacturing system is currently processing material. For example, active cooling control system may be disabled if a directed energy source is not also enabled. Alternatively, active cooling control system may be enabled whenever the additive manufacturing system is currently active, whether or not it is actively processing material. For example, a cooling routing may be programmed such that the additive manufacturing machine re-traces previously processed areas in order to manage the cooling of those areas and to prepare the build part for additional processing.

Figure 3A:
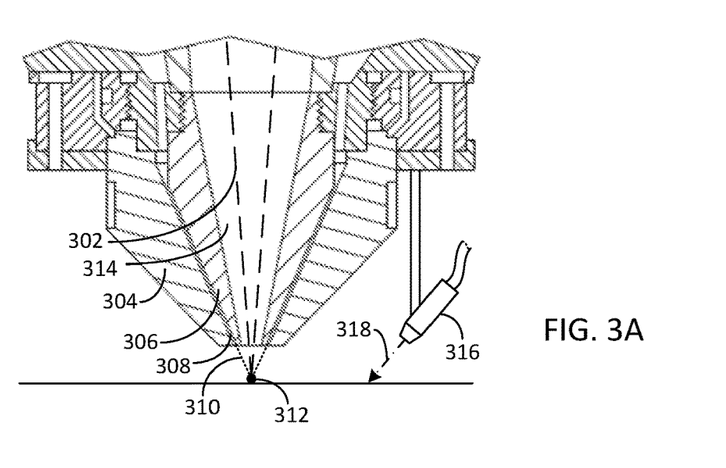
FIGS. 3A-3C depict examples of nozzle assemblies of an additive manufacturing machine with various gas flow configurations.

FIG. 3A depicts a portion of a nozzle assembly, which may form a portion of the deposition element 120 of FIG. 1. The depicted portion of the nozzle assembly includes an inner nozzle 306 mounted coaxially with an outer nozzle 304, thereby forming a conical powder channel 308. Powder flowing through the conical powder channel 408 (e.g., in a carrier gas) exits through an annular gap and forms a powder cone 310 which converges at a powder focal point in melt pool 312. Laser beam 302 similarly converges at a focal point in melt pool 312.

One of the gas flows in FIG. 3A is a shield gas flow, which in this example flows through the laser beam channel 314 towards melt pool 312. Another gas flow is a carrier gas flow, which carries the powder through conical powder channel 308. A further gas flow is an off-axis gas flow 318 which is directed by an off-axis auxiliary gas nozzle 316. In this example, nozzle 316 is not coaxially mounted as with the examples in FIGS. 3B and 3C. Instead, nozzle 316 may be an external nozzle that is affixed to the nozzle assembly in various ways, including impermanently. Note that the particular style and location of auxiliary gas nozzle is just one example, and such a nozzle could be attached to different portions of a deposition element to direct cooling gases. Further, while only one auxiliary gas nozzle 316 is depicted in FIG. 3A, a plurality of auxiliary gas nozzles could be used in other examples.

In other examples, off-axis auxiliary gas nozzle 316 may be mounted completely independently of the nozzle assembly, such as to other parts of an additive manufacturing machine, or even affixed to a build platform or other fixed structure. In this way, the off-axis auxiliary gas nozzle provides for a very flexible arrangement of auxiliary gas flow.

Each of the gas flows described with respect to FIG. 3A (shield, carrier, and auxiliary) may be actively cooled by a cooling system, such as cooling system 132 of FIG. 1. Further, each of these gas flows may be controlled by an active cooling control system, such as described with respect to FIG. 2, which may be an element of control system 104 of FIG. 1. In other examples, control system 104 of FIG. 1 may control the active cooling directly.

In some examples, a subset of all available gas flows may be cooled. For example, the auxiliary gas flow 318 may be actively cooled, while the shield and carrier gas flow may not be actively cooled. Note though that such gas flows may still have cooling properties even if the gas flow itself is not actively cooled. Further, the gases for each flow may be different. For example, the carrier and shield gas flows may be argon, while the auxiliary gas flow is a gas or gas mixture that has a higher thermal conductivity, such as helium, or a helium-argon mixture. These are just a few examples, and many others are possible.

Figure 3B:
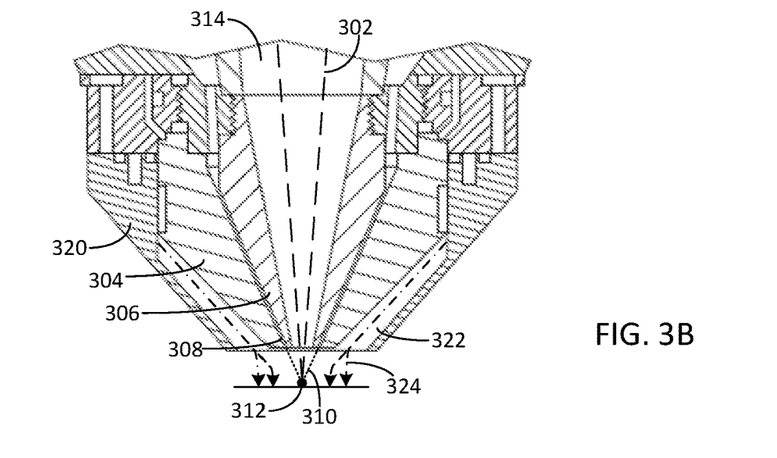

FIG. 3B depicts a portion of a nozzle assembly with an auxiliary gas nozzle 320. Like in FIG. 3A, the depicted portion of the nozzle assembly includes an inner nozzle 306 mounted coaxially with outer nozzle 304, thereby forming a conical powder channel 308. Powder flowing through the conical powder channel 308 exits through an annular gap and forms a powder cone 310 which converges at a powder focal point in melt pool 312. Laser beam 302 similarly converges at a focal point in melt pool 312.

Like in FIG. 3A, shield gas flows through the laser beam channel 314 towards melt pool 312 and carrier gas flows through powder channel 308. However, in FIG. 3B, an additional auxiliary gas flow 324, such as shield gas or cooling gas, is directed around melt pool 312. In this embodiment, the auxiliary gas channel 322 is formed between outer nozzle 304 and a coaxially mounted auxiliary gas nozzle 320. In this example, the auxiliary gas flow 324 is narrowly "focused" to direct the auxiliary gas 324 around a periphery of melt pool 312. For example, the auxiliary gas 324 may strike the part being manufactured in a concentric circular pattern around, but not within melt pool 312. As depicted, the auxiliary gas 324 flow may "bend" as it leaves the auxiliary gas channel 322 and becomes influenced by other flows, such as the shield gas flow, convective flows from the melt pool, etc. The auxiliary gas flow 324 may be used to actively cool the part being manufactured.

As above, each of the gas flows described with respect to FIG. 3B (shield, carrier, and auxiliary) may be actively cooled by a cooling system, such as cooling system 132 of FIG. 1. Further, each of these gas flows may be controlled by an active cooling control system, such as described with respect to FIG. 2, which may be an element of control system 104 of FIG. 1. In other examples, control system 104 of FIG. 1 may control the active cooling directly. Further as above, a subset of all available gas flows may be cooled. For example, the auxiliary gas flow 324 may be actively cooled, while the shield and carrier gas flow may not be actively cooled. Note though that such gas flows may still have cooling properties even if the gas flow itself is not actively cooled. Further, the gases for each flow may be different. For example, the carrier and shield gas flows may be argon, while the auxiliary gas flow is a gas or gas mixture that has a higher thermal conductivity, such as helium, or a helium-argon mixture. These are just a few examples, and many others are possible.

Figure 3C:
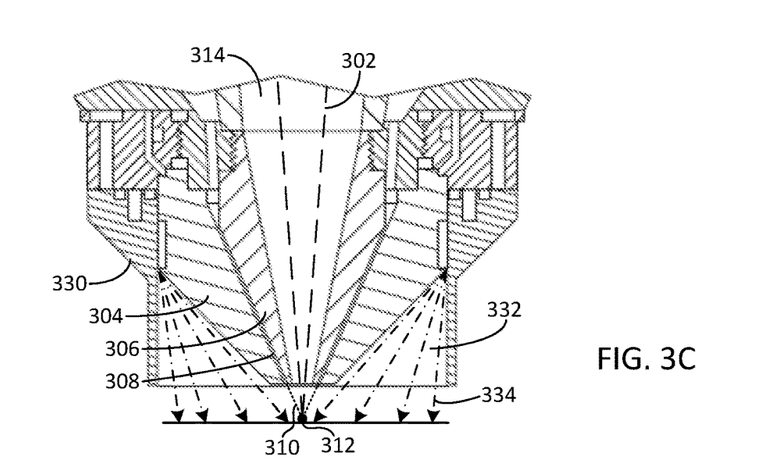

FIG. 3C depicts a portion of a nozzle assembly with another auxiliary gas nozzle 330. Like in FIGS. 3A and 3B, the depicted portion of the nozzle assembly includes an inner nozzle 306 mounted coaxially with outer nozzle 304, thereby forming a conical powder channel 308. As above, powder flowing through the conical powder channel 308 exits through an annular gap and forms a powder cone 310 which converges at a powder focal point in melt pool 312. Laser beam 302 similarly converges at a focal point in melt pool 312.

Like in FIGS. 3A and 3B, shield gas flows through the laser beam channel 314 towards melt pool 312. Additionally, like in FIG. 3B, an auxiliary gas flow 324, such as shield gas or cooling gas, is directed towards melt pool 312. In this embodiment, the auxiliary gas channel 332 is formed between outer nozzle 304 and a coaxially mounted auxiliary gas nozzle 330. In this example, the auxiliary gas flow 334 is widely "focused" to direct the auxiliary gas 334 towards a broad area around melt pool 312. For example, the auxiliary gas 324 may strike the part being manufactured in broader circular pattern around melt pool 312.

As above, each of the gas flows described with respect to FIG. 3C (shield, carrier, and auxiliary) may be actively cooled by a cooling system, such as cooling system 132 of FIG. 1. Further, each of these gas flows may be controlled by an active cooling control system, such as described with respect to FIG. 2, which may be an element of control system 104 of FIG. 1. In other examples, control system 104 of FIG. 1 may control the active cooling directly. Further as above, a subset of all available gas flows may be cooled. For example, the auxiliary gas flow 334 may be actively cooled, while the shield and carrier gas flow may not be actively cooled.

Notably, FIGS. 3B and 3C depict just two examples of auxiliary gas nozzles, but many other designs are possible. In general, an auxiliary gas nozzle may be designed to shape the auxiliary gas flow in a manner best fit for a particular application. Further, while FIGS. 3B and 3C are shown without an auxiliary gas nozzle, like nozzle 316 in FIG. 3A, an auxiliary gas nozzle could also be fitted to the nozzle assembly depicted in FIGS. 3B and 3C and serve the same purpose as described above.

Figure 4:
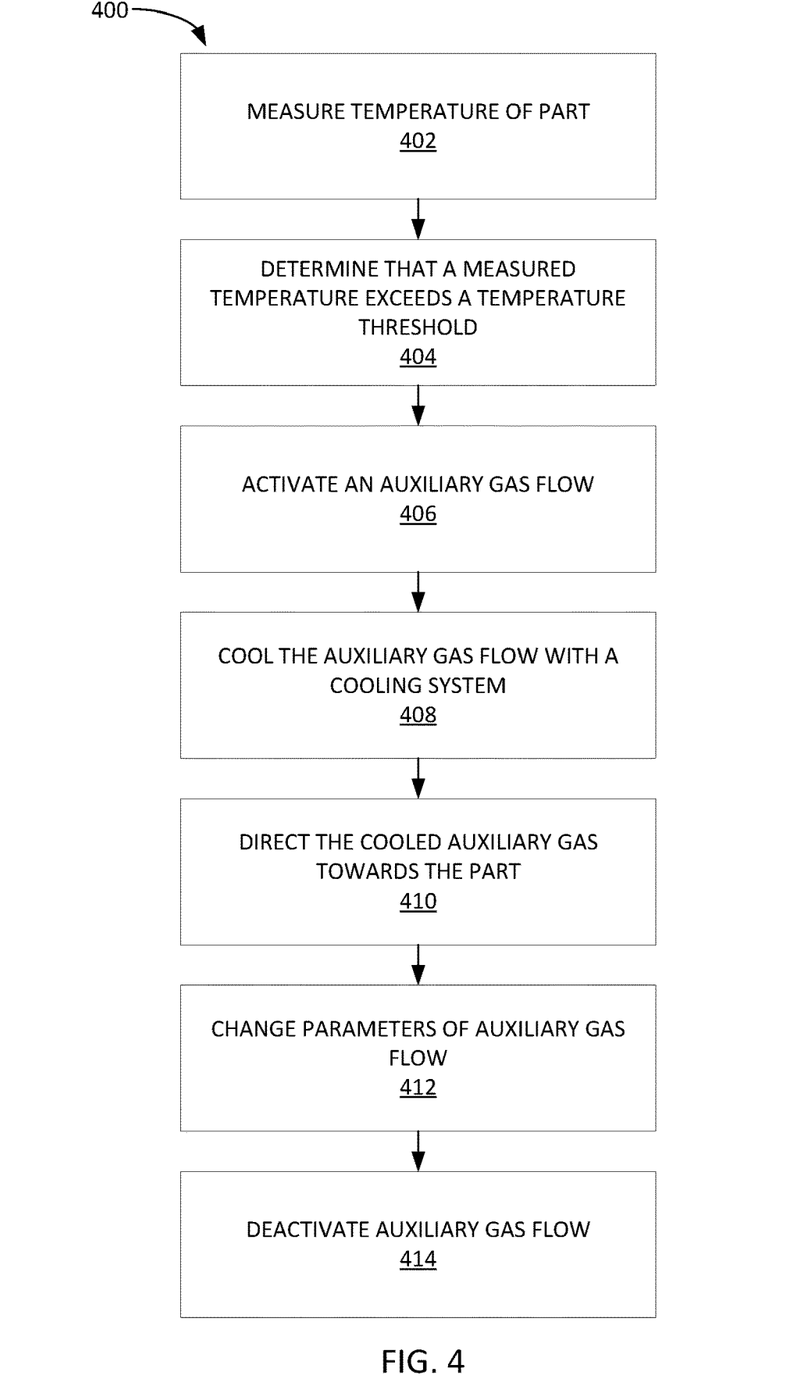
FIG. 4 depicts a method of controlling an actively cooled gas flow in an additive manufacturing machine.

FIG. 4 depicts a method of controlling an actively cooled gas flow in an additive manufacturing machine. In some examples, the additive manufacturing machine is a laser metal deposition machine, such as additive manufacturing machine 100 of FIG. 1.

Method 400 begins at step 402 with measuring a temperature of a part being processed by the additive manufacturing machine. In some examples, measuring the temperature is performed with a contact-less temperature sensor of the additive manufacturing machine, such as a laser or photo-based sensor, as described above. In other examples, the temperature sensor may be a contact-based temperature sensor.

Method 400 then proceeds to step 404 with determining that the measured temperature exceeds a temperature threshold. For example, the temperature threshold could be stored as a parameter in a control system, such as control system 104 in FIG. 1. In some examples, it may be an averaged temperature compared to the temperature threshold in order to avoid errant readings causing activations or deactivations of a cooling system unnecessarily.

Method 400 then proceeds to step 406 with activating an auxiliary gas flow. For example, a control system such as control system 104 of FIG. 1 may send a commend to a gas feed, such as gas feed 110 of FIG. 1, in order to initiate a gas flow. In some cases, the auxiliary gas flow may comprise a gas that is not present in a carrier gas flow or a shield gas flow. For example, the auxiliary gas flow may comprise a gas with a higher thermal conductivity than the carrier gas flow or shield gas flow, such as helium.

Method 400 then proceeds to step 408 with actively cooling the auxiliary gas flow with a cooling system. In some cases, the active cooling may be by a refrigeration system, or a vortex cooling system, or an evaporative cooling system, or others as are known. In some examples, the amount of cooling of the auxiliary gas may be set by a parameter and controlled by a control system, such as control system 104 of FIG. 1.

Method 400 then proceeds to step 410 with directing the cooled auxiliary gas flow towards the part being additively manufactured, such as part layers 122 in FIG. 1. In some examples, the cooled auxiliary gas flow is directed towards the part by a nozzle external to a deposition element of the additive manufacturing machine, such as described with respect to FIG. 3A. In other examples, the cooled auxiliary gas flow is directed towards the part by an auxiliary gas nozzle connected to a deposition element of the additive manufacturing machine, such as described with respect to FIGS. 3B and 3C. In yet further examples, the cooled auxiliary gas may be directed towards the part by an auxiliary gas nozzle and one or more external nozzles.

Method 400 then proceeds to step 412 with changing one or more parameters of the auxiliary gas flow. For example, a flow rate of the cooled auxiliary gas flow may be changed based on the measured temperature. For example, the flow rate may be increased as the measured temperature increases, or decreased as the measured temperature decreases. As described above, a function, look-up table, or the like may be used to determine the appropriate parameter value based on the measured temperature. As another example, the flow rate of the cooled auxiliary gas flow may be changed based on a material composition of the part, such as a type of metal. Because some metals are more conductive than others, the flow rate may need to be higher or lower to maintain temperature within a preferred zone.

Method 400 then proceeds to step 414 with deactivating an auxiliary gas flow. For example, the auxiliary gas flow may be deactivated when a measured temperature falls back below the temperature threshold. In some examples, the activation and deactivation of the auxiliary gas flow based on temperatures may have a hysteresis element (or overrun or underrun) to prevent rapid cycling as the temperature moves around a threshold temperature. Further yet, in some examples, the auxiliary gas flow may be deactivated when a directed energy source (e.g., a laser) of the additive manufacturing machine is deactivated.

As described above with respect to FIG. 2, in some cases a temperature measurement may not be available. In such cases, method 400 may commence with step 406 based on an alternative logic, such as based on when a directed energy source is activated. In such a case, the cooling of the auxiliary gas flow may be based on an open loop set of parameters instead of a closed feedback loop.

Notably, method 400 is just one example of a method for controlling an additive manufacturing machine in accordance with the concepts discussed herein. Other methods, which include more steps, fewer steps, or a different set of steps are possible as would be apparent to persons of skill in the art.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of controlling an additive manufacturing machine, comprising:
   measuring a first temperature of a part being processed by the additive manufacturing machine;
   activating an auxiliary gas flow based on determining that the measured first temperature exceeds a temperature threshold;
   cooling the auxiliary gas flow with a cooling system; and
   directing the cooled auxiliary gas flow towards the part via an auxiliary gas channel, wherein:
      the auxiliary gas channel is formed between a first nozzle and a second nozzle of a deposition head of the additive manufacturing machine, and
      the auxiliary gas channel is separate from a powder channel formed between the second nozzle and a third nozzle of the deposition head; and
      at least a portion of the auxillary gas flow comprises a gas that is not present in a carrier gas flow within the powder channel of the deposition head and not present in a shield gas flow within a laser beam channel of the deposition head.

2. The method of claim 1, wherein the additive manufacturing machine is a laser metal deposition machine.

3. The method of claim 1, further comprising:
   measuring a second temperature of the part being processed by the additive manufacturing machine; and
   changing a flow rate of the cooled auxiliary gas flow from a first flow rate to a second flow rate based on the measured second temperature.

4. The method of claim 3, further comprising:
   determining a predefined parameter value based on the measured second temperature; and
   changing the flow rate of the cooled auxiliary gas flow from the first flow rate to the second flow rate based on the predefined parameter value.

5. The method of claim 1, further comprising: changing a flow rate of the cooled auxiliary gas flow from a first flow rate to a second flow rate based on a material composition of the part.

6. The method of claim 1, further comprising:
   measuring a second temperature of the part being processed by the additive manufacturing machine; and
   deactivating the auxiliary gas flow based on determining that the measured second temperature is below the temperature threshold.

7. The method of claim 1, wherein measuring the first temperature is performed with a contact-less temperature sensor of the additive manufacturing machine.

8. The method of claim 1, wherein measuring the first temperature is performed with an infrared-based optical sensor.

9. The method of claim 1, further comprising: deactivating the auxiliary gas flow when a directed energy source of the additive manufacturing machine is deactivated.

10. The method of claim 1, wherein the cooling system comprises one of a refrigeration system or vortex cooler.

11. An additive manufacturing machine, comprising:
a directed energy source;
a deposition head, comprising:
an auxiliary gas channel formed between a first nozzle and a second nozzle of the deposition head; and
a powder channel, separate from the auxiliary gas channel, and formed between the second nozzle and a third nozzle of the deposition head;
a temperature sensor;
a cooling system;
a memory comprising computer-executable instructions; and
a processor configured to execute the computer-executable instructions and cause the additive manufacturing machine to:
measure a first temperature of a part being processed with the temperature sensor;
activate an auxiliary gas flow based on determining that the measured first temperature exceeds a temperature threshold;
cool the auxiliary gas flow with the cooling system; and
direct the cooled auxiliary gas flow towards the part via the auxiliary gas channel,
wherein at least a portion of the auxillary gas flow comprises a gas that is not present in a carrier gas flow within the powder channel of the disposition head and not present in a shield gas flow within a laser beam channel of the deposition head.

12. The additive manufacturing machine of claim 11, wherein the additive manufacturing machine is a laser metal deposition machine.

13. The additive manufacturing machine of claim 11, wherein the processor is further configured to execute the computer-executable instructions and cause the additive manufacturing machine to:
measure a second temperature of the part being processed by the additive manufacturing machine; and
change a flow rate of the cooled auxiliary gas flow from a first flow rate to a second flow rate based on the measured second temperature.

14. The additive manufacturing machine of claim 13, wherein the processor is further configured to execute the computer-executable instructions and cause the additive manufacturing machine to:
determine a predefined parameter value based on the measured second temperature; and
change the flow rate of the cooled auxiliary gas flow from the first flow rate to the second flow rate based on the predefined parameter value.

15. The additive manufacturing machine of claim 11, wherein the processor is further configured to execute the computer-executable instructions and cause the additive manufacturing machine to: change a flow rate of the cooled auxiliary gas flow based on a material composition of the part.

16. The additive manufacturing machine of claim 11, wherein the processor is further configured to execute the computer-executable instructions and cause the additive manufacturing machine to:
measure a second temperature of the part being processed by the additive manufacturing machine; and
deactivate the auxiliary gas flow based on determining that the measured second temperature is below the temperature threshold.

17. The additive manufacturing machine of claim 11, wherein the temperature sensor is a contact-less temperature sensor.

18. The additive manufacturing machine of claim 11, wherein the temperature sensor is an infrared-based optical sensor.

19. The additive manufacturing machine of claim 11, wherein the processor is further configured to execute the computer-executable instructions and cause the additive manufacturing machine to: deactivate the auxiliary gas flow when the directed energy source of the additive manufacturing machine is deactivated.

20. The additive manufacturing machine of claim 11, wherein the cooling system comprises one of a refrigeration system or vortex cooler.

* * * * *